United States Patent [19]
Schulze

[11] 3,821,755
[45] June 28, 1974

[54] PHOTOGRAPHIC CAMERA

[75] Inventor: Heinz Schulze, Dresden, Germany

[73] Assignee: VEB PENTACON DRESDEN Kamera-und Kinowerke, Dresden, Germany

[22] Filed: May 3, 1973

[21] Appl. No.: 357,014

[30] Foreign Application Priority Data
Nov. 9, 1972 Germany............................ 0316675

[52] U.S. Cl. .................................... 354/24, 354/28
[51] Int. Cl. ............................................ G03b 7/04
[58] Field of Search............... 95/11 R, 10 C, 10 FS

[56] References Cited
UNITED STATES PATENTS

| | | | |
|---|---|---|---|
| 3,212,421 | 10/1965 | Hackenberg | 95/10 FS |
| 3,385,185 | 5/1968 | Schulze | 95/10 C |
| 3,485,153 | 12/1969 | Ono et al. | 95/10 C |
| 3,646,861 | 3/1972 | Fujii | 95/10 C |

Primary Examiner—Robert P. Greiner
Attorney, Agent, or Firm—William Anthony Drucker

[57] ABSTRACT

A camera comprises a galvanometer rotatably mounted in the camera housing. The moving coil of the galvanometer is provided with a pointer which is visible through a window in the housing and is adjustable in relation to a fixed mark also visible in the window. The galvanometer is movable bodily, against a spring attached to the outside of the magnet yoke, by diaphragm aperture and/or exposure time setting members. A current source for the galvanometer also serves to illuminate a light source in circuit with a switch. Also attached to the yoke is a cam which closes the switch at the moment of entry of the nondeflected pointer into the window so that the light source will indicate adverse light conditions.

4 Claims, 3 Drawing Figures

PHOTOGRAPHIC CAMERA

BACKGROUND TO THE INVENTION

The invention relates to a photographic camera with a built-in exposure meter the measuring element of which is mounted, as a whole or in part, on a rotary support, for example by means of the fixed end of the return spring, and is coupled with adjusters for exposure factors such as diaphragm, exposure time and sensitivity of the film.

With cameras of this type it is possible to bring the pointer of the measuring element into the measuring position characterised by an observation window or a permanent mark, even if the rotating coil carrying the pointer does not show a deflection, i.e. if it remains in the zero position of the measuring element, due to unsatisfactory light conditions. Because the appearance of the pointer of the measuring element in the measuring position indicates to the photographer that he can expect to obtain a satisfactorily exposed picture with the adjustment he has made, warning devices have already been proposed which cover the observation window or switch off the measuring current when the pointer remaining in the zero position enters into the measuring position. In order to cover the observation window, shutters are connected to the rotary measuring element which require either sufficient swivelling space over the circumference of the whole angle of deflection of the measuring element or a special gear arrangement for coupling this shutter at the moment when the zero position of the measuring device enters into the measuring position; this presents constructional difficulties, especially if the pointer of the measuring element is arranged in the beam of rays of the view finder. The other known measure of switching off the measuring current has the result that the rotary coil carrying the pointer of the measuring element is deprived of the weak measuring current which, however, does not suffice for a recognizable deflection because the rotary coil then moves into the zero position in a manner which is hardly noticeable to the operator. Consequently, the entry of the pointer remaining in the zero position of the measuring element into the measuring position is not effectively indicated to the photographer. It is further known to cause the pointer of the measuring element to carry out a sudden deflection when the zero point of the measuring element enters into the measuring position by connecting a light-independent current source. This arrangement burdens the sensitive measuring element and results in an unsteady position of the pointer.

The object of the invention is to obviate the above disadvantages by providing a simple and operationally safe warning device for indicating the entry of the pointer remaining in the zero position of the measuring element into the measuring position.

SUMMARY OF INVENTION

This is achieved according to the invention by coupling the rotary support with a trigger cam which operates a switch when the zero point enters in to the measuring position, said switch being arranged in the circuit of a light source, preferably an electroluminescence diode. The light source is expediently designed as a warning signal which is switched on when the non-displaced pointer of the measuring element enters into the measuring position. According to a further embodiment, the light source is preferably designed to illuminate the observation window and is switched off when the non-displaced pointer of the measuring element enters into the measuring position.

BRIEF DESCRIPTION OF DRAWINGS

The invention is explained with the aid of embodiments illustrated and described below.

DESCRIPTION OF PREFERRED EMBODIMENT

Figure 1:
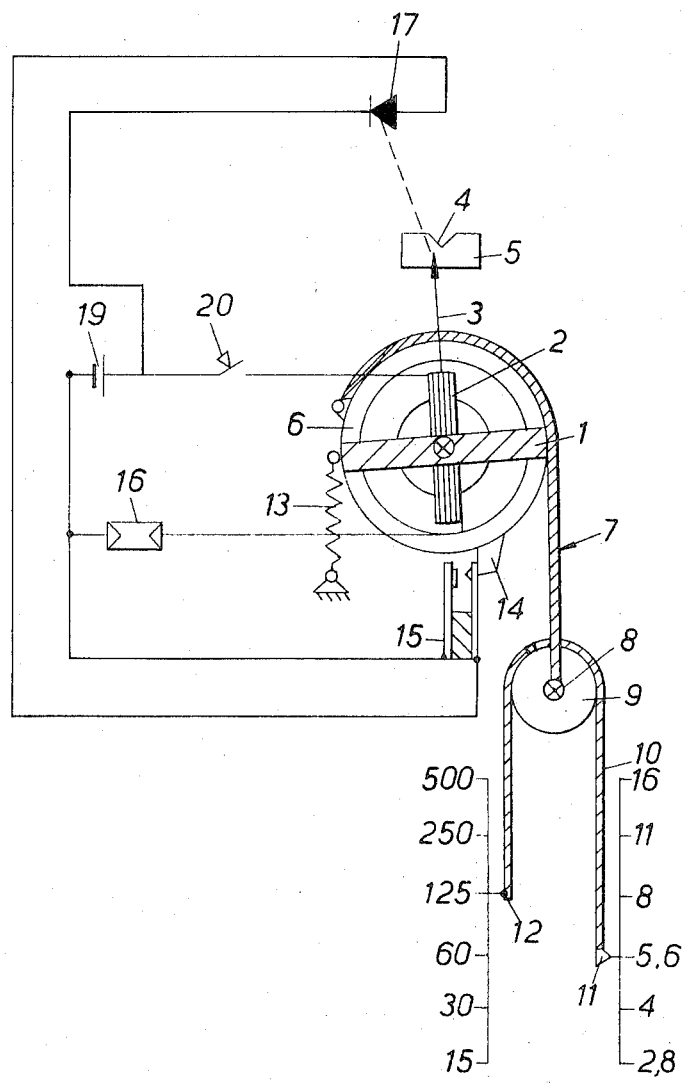
FIG. 1 shows an embodiment with a warning light in the observation window.
Figure 3:
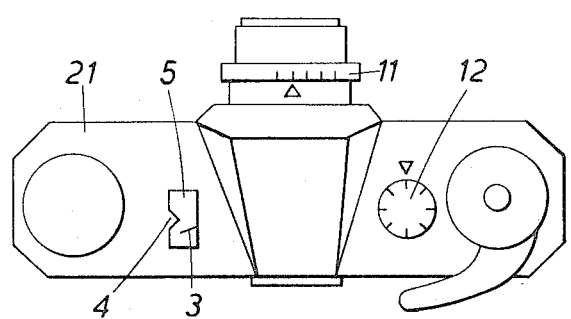
FIG. 3 shows a plan view of the camera.

In a camera housing 21 (see FIG. 3) the measuring element 1 (see FIG. 1) is povotally mounted, its rotary coil 2 carrying the pointer 3 of the measuring element which oscillates opposite a permanent mark 4 visible in an observation window 5. To the return path ring (yoke) 6 of the measuring element 1 there is secured the end of a cable 7 which is secured at the other end to the axle 8 of a roll 9. A further cable 10 is placed around the roll 9, a diaphragm setter 11 and a time setter 12, respectively, being fixed to the two ends of the cable 10. In addition if required the ring 6 can be displaced by a film sensitivity adjuster. A tension spring 13 endeavours to tighten the cables 7 and 10. Furthermore, a trigger cam 14 is provided on the return path ring 6, a switch 15 being arranged in its path. The switch 15 is situated in the circuit of the electro-luminescence diode 17 which illuminates the observation window 5. The measuring circuit is formed by a photoresistor 16, the moving coil 2, a battery 19 and a switch 20.

The warning device operates as follows:

By moving the diaphragm setter 11 and the time setter 12, the measuring element 1 is rotated via the cable 7 clockwise against the tension spring until the pointer 3 stands opposite the permanent mark 4, i.e. until it has reached its measuring position. A diaphragm/time ratio corresponding to the prevailing brightness of the object is thus adjusted.

If the brightness of the object is so low that the rotating coil 2 shows no deflection but remains in the zero or non displaced, position then the trigger cam 14 closes the switch 15 shortly before the pointer 3 enters into the measuring position; the electro-luminescence diode is thus supplied with current causing it to light up.

Figure 2:
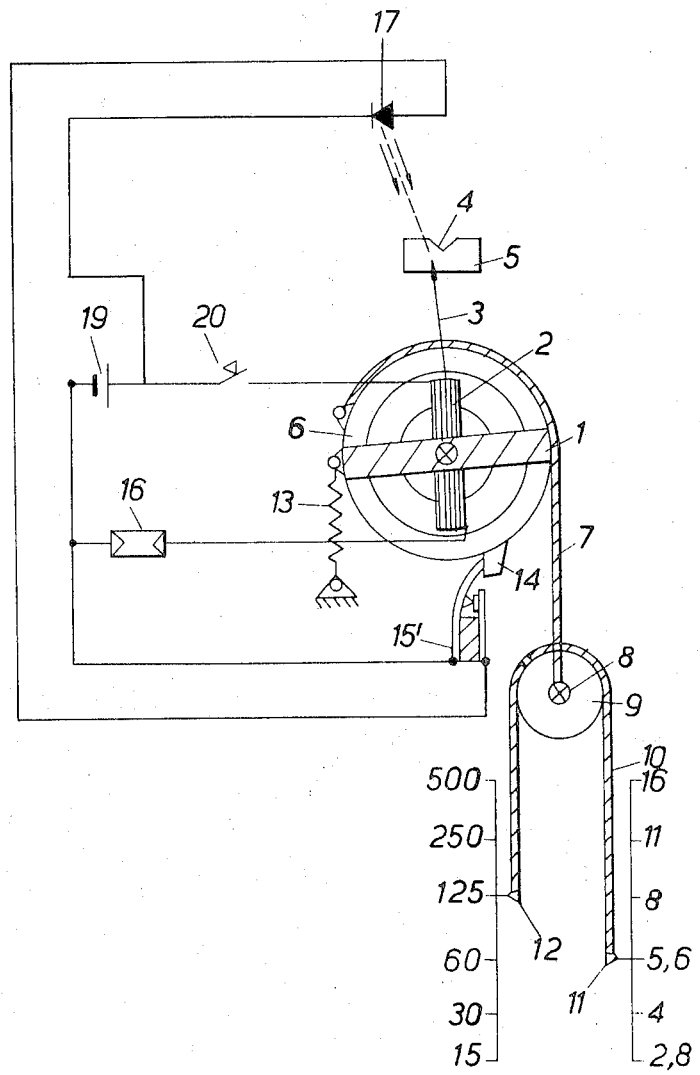
FIG. 2 shows an embodiment with illumination of the observation window.

In the other embodiment (see FIG. 2) the switch 15' is designed as a turn-off switch so that the electroluminescence diode 17 goes out when the non-displaced pointer 3 of the measuring element enters into the measuring position.

I claim:

1. In a photographic camera having a housing and a photoelectric exposure meter therein which includes a current source, a photoelectric cell, a galvanometer having a rotatably mounted rotary support adjustable by at least one exposure factor setting member of the camera, a moving coil having a pointer movable in an observation window, the provision of a. a light source in circuit with said current source, b. a switch arranged in said housing as provided in the circuit with the light source and said current source, c. a trigger cam on said rotary support and capable of operating said switch when the non-displaced pointer commences entry into the region of the observation window during adjustment of the exposure factor setting member.

2. A photographic camera according to claim 1, wherein the light source is designed as a warning signal and is switched on when the non-deflected pointer commences entry into the region of the observation window.

3. A photographic camera according to claim 1, wherein the light source is arranged to illuminate the observation window and is switched off when the non-deflected pointer enters into the measuring position.

4. A photographic camera according to claim 1, wherein the light source is an electro-luminescent diode.

* * * * *